United States Patent Office 3,485,642
Patented Dec. 23, 1969

3,485,642
COLOR COMPOSITIONS
Louis Koch, Yonkers, N.Y., assignor to H. Kohnstamm Company, New York, N.Y., a corporation of New York
No Drawing. Filed Mar. 10, 1965, Ser. No. 438,729
Int. Cl. A23l 1/27
U.S. Cl. 99—148                                    4 Claims

ABSTRACT OF THE DISCLOSURE

A non-toxic edible color composition of a water soluble dye, a water insoluble color lake suspended in an aqueous medium, and an edible organic acid.

---

This invention relates to new methods and compositions for coating and decorating or coloring solid compositions such as, for example, edible foods, drugs, tablets, pills, pellets, candies, condiments and chewing gum.

The invention permits utilization of Government approved (in accordance with the U.S. Food, Drug and Cosmetic Act) water-soluble food colors which are non-toxic in aqueous media without prior drawbacks such as the requirement that the coloring composition must be suspended in an adhesive aqueous suspending medium or that it must be suspended with the aid of a surfactant, many of which are proscribed by Government Statutes and/or regulations for use in food and drugs, and which are in any event frequently allergenic. When pre-formed FD & C color lakes have been suspended in water, the necessity for stability has required either a surfactant or a particular type of solution which would impart adhesive properties to the suspended color lake to provide at least temporary stability. Adhesive suspensions are frequently non-drying and hence of limited utility and when sugar is used to impart viscosity and/or adhesiveness, other drawbacks occur such as molding and other microbiological degradation. Furthermore, when FD & C dry color lakes are used, it is difficult, if not impossible, to grind or divide the solid material to a sufficiently fine powder to be suspended in water without surfactants or adhesive agents such as sugars.

These prior disadvantages have been overcome by the present invention which removes the need for surface active agents and provides stable non-toxic color compositions comprising FD & C colors which may be used to coat foods and drugs when required, but which have substantial shelf life and stability, even in the absence of adhesives or surfactants.

According to the present invention, the non-toxic FD & C color lake is formed in situ in an aqueous medium which may serve as all or part of the suspension vehicle for the ultimate coating composition. The resulting non-toxic composition may thus be used to coat edible solids when used in the presence of an organic non-toxic acid and a suitable non-toxic preservative. According to the present method the non-toxic water-soluble FD & C dye is converted substantially to a blend of an aqueous solution of water-soluble FD & C color and an insoluble FD & C color lake. The color lake is made in situ by extending the color on a finely divided substratum of alumina hydrate in an aqueous medium. In some instances it may be desirable to substitute the alumina hydrate in whole or in part by a suitable calcium compound. Thus, in the composition of the invention both the FD & C water-soluble dye and the water-insoluble FD & C color lake are present, the latter being in stable suspension and very finely divided in the aqueous medium, in the presence of a non-toxic organic acid and an edible preservative.

Suitable FD & C colors are those which are water-soluble and approved for food and drug use, including but not limited to FD & C Yellow #5, FD & C Yellow #6, FD & C Blue #1, FD & C Red #2, FD & C Red #3, and FD & C Violet #1. Non-toxic opaque materials may also be suspended in the aqueous medium if desired, for example, titanium dioxide, or calcium sulfate.

Parts and proportions are by weight herein unless otherwise stated.

While the process may be practiced in different manners in accordance with the present invention, a preferred embodiment commences with an alumina hydrate press cake. The press cake is fluidized by homogenizing it in a high speed mixer with water, for about five minutes, or longer if required, to finely divide and disperse the press cake, thereby forming a press cake slurry. Suitable weight ratios between the original water-containing press cake and the added suspension medium water may range from about 6:1 to about 3:1. Either during this mixing step, or later, the water-soluble FD & C color powder, or more than one, is thoroughly stirred into the fluidized press cake suspension. Suitable quantity of color may be between about 75% and about 125% of the weight of the press cake dry solids. The color powder preferably is introduced as a dry powder of particle size between about 40 and about 350 mesh. The water-soluble color dissolves and partially forms a lake with the suspended press cake particles and converts the system during mixing to an opaque gel-like structure. Addition of the color thickens the alumina hydrate-water sludge almost instantly. Mixing is continued until the structure is a homogeneous suspension, usually requiring between about five and ten minutes. The suspension is then acidified by adding between about 0.1% and about 0.4% (preferably about 0.2%) of an organic edible non-toxic acid, such as citric acid, based upon the total ultimate composition. Addition of the acid induces a more fluid, less gel-like structure.

A preservative, preferably sodium benzoate, is added in small quantity, e.g. of the order of one-tenth of one percent based upon the total ultimate composition. A suitable ratio of organic edible non-toxic acid to preservative is about 2:1. Other preservatives which are non-toxic may be used, for example, edible derivatives of benzoic acid, such as methyl and propyl esters of p-hydroxy benzoic acid.

The composition of the present invention may be made by dispersing the respective components in the water in any sequence, except that at least part of the non-toxic edible organic acid must be present during the dispersion of the press cake when the dissolved color is in the presence of the press cake, to provide a fluid composition. When the color and press cake are dispersed in the water in the absence of the organic acid a gel is formed and organic acid must be added to impart fluidity to the composition. Thus, the water, color, citric acid and sodium benzoate may all be dissolved together and the alumina press cake may then be dispersed therein. A fluidized dispersion is thereby achieved and the later addition of titanium dioxide does not interfere with the fluid state of the slurry. Alternatively, the citric acid and sodium benzoate may be added dry to the aluminum press cake and the mixture may be added to the water with the color predissolved therein. A fluid dispersion ensues immediately. Later addition of titanium dioxide does not render the dispersion materially less fluid. If desired, the titanium dioxide may be incorporated at an earlier stage. For example, the titanium dioxide may be added to the alumina initially, and both may be slurried into an aqueous solution of citric acid and sodium benzoate together with the dissolved color. If desired, the alumina press cake may be pre-mixed with the citric acid, sodium benzoate and titanium dioxide, after which the water with color dissolved therein may be added by mixing to form the fluid slurry. The presence of at least about 0.1% of the organic edible non-toxic acid, based on the ultimate total composition, breaks, or prevents the formation of, the gel which is formed by the combination of the aqueous dispersion of insoluble alumina in the presence of the FD & C water-soluble color. The gel, in the absence of the organic acid does not flow appreciably.

It is preferable in some cases, to add a fraction, for example half, of the ultimately required quantity of color to the press cake slurry followed by stirring and later addition of a fraction, for example, a half of the organic acid. The preservative may be added then or later. Thus, the initial viscosity of the gel-like slurry may be reduced by such selective step-wise addition of all or part of the organic acid, thereby facilitating the achievement of a homogeneous composition. The other half or additional fraction of the color may then be added to the composition, followed by still later addition of the remainder of the organic acid and preservative. The composition thus formed has good shelf life, homogeneity, and stability. The finished product may be thixotropic or fluid, depending upon the particular color dye or dyes used. Stirring time may vary between about five minutes and fifteen minutes.

The coatings may be applied in the usual manner as by pan coating techniques at the discretion of the user. In some instances, particularly when an opaque agent such as titanium dioxide is included in the coloring composition, a single coat will suffice to color a tablet or pill. The present compositions are compatible with titanium dioxide, which may be incorporated by stirring, whereas solid color lakes redispersed in water require prolonged homogenization techniques for stability in the presence of titanium dioxide therein, plus surfactants or adhesives.

However, a plurality of coats is preferred to impart abrasion resistance and adequate coating over the usual white undercoat, especially as against transportation hazards and mobility of tablets or pills within the container.

The coloring composition of the invention may be added to the usual simple sugar syrup, such as sucrose syrup, to impart the necessary tone or hue thereto. The composition may be added to other non-toxic tablet coating vehicles compatible with the aqueous system, e.g., natural and synthetic gums in colloidal solution. Normal commercial pan-coating and airblast drying techniques may ensue.

A further advantage of the present invention is that the particle size is much smaller than can be obtained by grinding a dry color lake. Also in the present process and with the composition of the present invention not all of the water-soluble dye is adsorbed on the water-insoluble substrate, thereby preserving and releasing some water-soluble color in solution, not insolubilized, thereby imparting more potent dyeing power to the composition.

Other organic acids which may be used in conjunction with the preservative and which are non-toxic are tartaric, phosphoric, malic, cyclamic, fumaric and adipic.

The exemplary formulations for the compositions of the present invention, prepared as described above, are as follows:

EXAMPLE I

| Component: | Parts by weight |
|---|---|
| Purified alumina hydrate press cake | 5400 |
| FD & C Yellow #5 | 720 |
| Sodium benzoate, U.S.P. | 7.2 |
| Citric acid, U.S.P. | 14.4 |
| Water | 900 |

EXAMPLE II

| Component: | Parts by weight |
|---|---|
| Purified alumina hydrate press cake | 5400 |
| FD & C Yellow #5 | 326 |
| Sodium benzoate, U.S.P. | 7.2 |
| Citric acid, U.S.P. | 14.4 |
| Water | 650 |

EXAMPLE III

| Component: | Parts by weight |
|---|---|
| Purified alumina hydrate press cake | 5400 |
| FD & C Yellow #5 | 720 |
| Sodium benzoate, U.S.P. | 8 |
| Citric acid, U.S.P. | 16 |
| Titanium dioxide N.F. | 702 |
| Water | 900 |

EXAMPLE IV

| Component: | Parts by weight |
|---|---|
| Purified alumina hydrate press cake | 5400 |
| FD & C Yellow #5 | 360 |
| Sodium benzoate, U.S.P. | 8 |
| Citric acid, U.S.P. | 16 |
| Titanium dioxide N.F. | 666 |
| Water | 1000 |

It is to be understood, of course, that other colors and suitable quantitative variations may be utilized within reasonable limits. It is preferred that the weight of the press cake should exceed that of the added water, it being understood that the press cake itself may contain intrinsically while in the wet stage as much as 80% by weight of water. Generally, the commercial press cake flows under pressure but not under gravity. It is preferred that the proportion of dry solids alumina hydrate content of the ultimate composition range between about 5% and 25% by weight. It is also preferred that alumina hydrate content range between about 2% and 20% of the weight of the water of the slurry, at least initially. It is to be understood that further dilution may be accomplished when desired by adding water after the color composition has been prepared.

While certain present preferred embodiments of the invention have been described herein, it is to be understood that the invention may be otherwise embodied and practiced within the spirit thereof and within the scope of the appended claims.

What is claimed is:

1. A non-toxic FD & C composition comprising a finely divided water insoluble substrate in aqueous suspension, an FD & C water soluble dye, a portion of said dye being absorbed into said finely divided water insoluble substrate to form in situ a color lake, the remaining portion of said FD & C water soluble dye being in solution in said composition, a non-toxic organic acid, an edible preservative, a non-toxic inorganic opacifying agent and a non-toxic coating vehicle compatible with said aqueous system, said non-toxic acid comprising at least about 0.1% by weight of said composition and said weight of said non-toxic acid being less than the weight of each of said water insoluble substrate, water soluble FD & C dye and opacifying agent.

2. A composition according to claim 1 wherein said water insoluble substrate is an alumina hydrate.

3. A composition according to claim 2 wherein the weight of said alumina hydrate calculated on a dry weight basis present in said composition comprises between 5 and about 25% by weight of said composition.

4. A non-toxic FD & C composition comprising:
 (a) a finely divided alumina hydrate substrate in aqueous suspension, the weight of said alumina hydrate calculated on a dry weight basis present in said composition comprising between about 5 and about 25% by weight of said composition;
 (b) an FD & C water soluble dye, a portion of which is absorbed into said alumina hydrate to form in situ a color lake therewith, the other portion of said FD & C water soluble dye remaining in solution in said composition, said dye comprising about 75 to about 125% by weight of the dry weight of said alumina hydrate;
 (c) a non-toxic organic acid comprising about 0.1% to about 0.4% by weight of said composition;
 (d) an edible preservative;
 (e) a non-toxic inorganic white opacifying material; and
 (f) a non-toxic vehicle comprising a sugar.

References Cited

UNITED STATES PATENTS

| | | | |
|---|---|---|---|
| 2,915,475 | 12/1959 | Bugosh | 99—148 X |
| 3,031,418 | 4/1962 | Bugosh | 252—313 |
| 3,054,724 | 9/1962 | Raff | 99—148 X |

OTHER REFERENCES

Jacobs Food Adjuncts, D. Van Nostrand Co., Inc., 1947, New York, pp. 41 and 45.

MAURICE W. GREENSTEIN, Primary Examiner

H. H. KLARE III, Assistant Examiner

U.S. Cl. X.R.

99—166